United States Patent [19]

Pelton

[11] Patent Number: 5,457,309

[45] Date of Patent: Oct. 10, 1995

[54] PREDICTIVE BAR CODE DECODING SYSTEM AND METHOD

[75] Inventor: Walter E. Pelton, Charlotte, N.C.

[73] Assignee: Hand Held Products, Charlotte, N.C.

[21] Appl. No.: 210,330

[22] Filed: Mar. 18, 1994

[51] Int. Cl.[6] .................................................. G06K 7/10
[52] U.S. Cl. ...................... 235/462; 235/466; 235/472
[58] Field of Search ...................... 235/466, 454, 235/462, 463, 472

[56] References Cited

U.S. PATENT DOCUMENTS

| | | | |
|---|---|---|---|
| 3,432,032 | 3/1969 | Curphey et al. | |
| 3,909,787 | 9/1975 | Laurer et al. | 235/462 |
| 3,949,363 | 4/1976 | Holm | 235/462 |
| 3,986,000 | 10/1976 | McJohnson | 235/463 |
| 4,104,514 | 8/1978 | Sherer et al. | 235/466 |
| 4,160,156 | 7/1979 | Sherer | 235/463 |
| 4,275,380 | 6/1981 | Gardner et al. | 382/69 |
| 4,356,389 | 10/1982 | Quirey et al. | 235/455 |
| 4,411,016 | 10/1983 | Wakeland | 382/62 |
| 4,644,143 | 2/1987 | McJohnson et al. | 235/462 |
| 4,682,015 | 7/1987 | Quan | 235/472 |
| 4,717,818 | 1/1988 | Broockman et al. | 235/462 |
| 4,728,784 | 3/1988 | Stewart | 235/462 |
| 4,800,256 | 1/1989 | Broockman et al. | 235/467 |
| 4,902,883 | 2/1990 | Poland | 235/462 |
| 5,015,833 | 5/1991 | Shepard et al. | 235/472 |
| 5,036,182 | 6/1991 | Ouchi et al. | 235/462 |
| 5,140,144 | 8/1992 | Shepard et al. | 235/472 |
| 5,159,340 | 10/1992 | Smith | 341/132 |
| 5,166,500 | 11/1992 | Yoon et al. | 235/463 |
| 5,168,275 | 12/1992 | Harrison et al. | 341/71 |
| 5,231,293 | 7/1993 | Longacre, Jr. | 250/568 |
| 5,281,800 | 1/1994 | Pelton et al. | 235/462 |
| 5,286,960 | 2/1994 | Longacre, Jr. et al. | 235/463 |
| 5,336,874 | 8/1994 | Hasegawa | 235/466 |

*Primary Examiner*—Donald T. Hajec
*Assistant Examiner*—Mark S. Tremblay
*Attorney, Agent, or Firm*—Bell, Seltzer, Park & Gibson

[57] ABSTRACT

Energy is conserved in a bar code reader by taking bar code samples on demand or as necessary, primarily when a data bearing feature of the bar code is predicted to be proximate. A plurality of samples are obtained for a bar code. Preferably, an analog to digital converter converts each of the samples into a multi-bit digital value. A feature detector is connected to the analog to digital converter for detecting bar code features from the plurality of multi-bit digital values. The displacements among the detected data bearing features are compared to thereby determine the width of bars having first and second data values in order to decode the bar code. Preferably, a relative scan speed is extracted and kept current during the scan in order to predict code feature locations. Preferably the decoding proceeds concurrently with the sampling. A controller regulates the execution of sampling based upon the predicted feature locations, and preferably reduces or eliminates sampling when no required feature is predicted.

78 Claims, 9 Drawing Sheets

PREDICTIVE BAR CODE DECODING SYSTEM AND METHOD

FIELD OF THE INVENTION

This invention relates to data recognition systems and methods, and more particularly to bar code sensing and reading systems and methods.

BACKGROUND OF THE INVENTION

Systems and methods for optically sensing and decoding data are known to those skilled in the art. Portable systems are also known for optically sensing and decoding data. See U.S. Pat. No. 3,509,353 entitled *Portable Record Reader* by Sundblad et al., U.S. Pat. No. 3,716,699 entitled *Method and Apparatus for Optical Code Reading* by Eckert, Jr. et al., U.S. Pat. No. 3,736,410 entitled *Hand Held Apparatus for Sensing Data Bits Carried on a Sheet* by Ragland et al., U.S. Pat. No. 3,748,483 entitled *Indicating Device for Use In Optical Sensing Equipment* by Englund et al., U.S. Pat. No. 3,925,639 entitled *Method and Apparatus for Reading Bar Coded Data Wherein a Light Source is Periodically Energized* by Hester, U.S. Pat. No. 4,072,859 entitled *Wand Turn-On Control* by McWaters, and U.S. Pat. No. 4,160,156 entitled *Method and Apparatus for Reading Bar Coded Data Wherein The Light Source Is Periodically Energized* by Sherer.

Portable systems have been used for data collection in a broad range of operations, including inventory control in retail stores and in the tracking of packages or cargo in the delivery industry. Portable optical reading units are typically battery powered or attached to a terminal station which supplies a power source.

Codes have been produced, and printed on products or containers, to increase the accuracy of such data collection systems. One such code is a "bar code" which may be read by passing an optical sensing unit over the bar code on the product or by passing the product over the optical sensing unit. A bar code typically consists of a pattern of black and white bars of varying widths, with the encoded information determined by the sequence of these varying width bars. Bars are scanned by the optical sensing unit and the widths of the bars are then translated into a specific identifying sequence for that particular item.

An optical sensing unit typically requires a source of radiation to illuminate the bar coded data which normally places a significant drain on the battery. As the applications of these portable optical sensing units continue to expand, users of such units continue to demand lighter weight, lower cost, and extended usage time from these units. Hence, the amount of power used by the radiation source and the accompanying sensing and decoding circuits continue to be a major obstacle in expanding applications.

One patent which describes a low power bar code reader is U.S. Pat. No. 5,281,800 entitled *Method and Apparatus for Low Power Optical Sensing and Decoding of Data* and is assigned to the assignee of the present invention. As described, a light source is flashed at a low frequency until a bar code is placed in the optical path of the light source. The light source is then flashed at a higher frequency during the capture of bar code information. Bar codes are detected by producing a frequency modulated series of pulses which provide an indicator of the detected bar code. In an alternative embodiment, the output of a light detector may be quantized and applied to a resettable digital integrator to produce a direct digital output. A digital implementation of a pulse counting circuit is thereby provided. The '800 patent uses less power than the prior art, but may not save power during a bar code decoding sequence after the presence of a bar code has been detected in the optical path.

As portable bar code reading systems have become more widely used, systems have also been developed to instruct users in the operation of bar code scanners and to evaluate the print quality of bar codes. For example, U.S. Pat. No. 5,231,293 entitled *Bar Code Reading Instrument Which Prompts Operator to Scan Bar Codes Properly* to Longacre, Jr. discloses a bar code reading wand which prompts the user to scan faster, slower, or more evenly. A bar code is manually scanned to provide a bar code signal. The signal is then sampled in an analog to digital converter at a constant rate to provide successive data signal samples. The digital samples are stored by a central processing unit in a scan profile block of locations in a random access memory. The stored data samples are then used to determine if a code was properly received or if an instructive prompt is required for a re-scan.

SUMMARY OF THE INVENTION

It is therefore an object of the present invention to provide improved systems and methods for sensing and reading bar code data.

It is another object of the present invention to provide systems and methods for low power sensing and reading of bar code data.

It is still another object of the present invention to provide systems and methods for saving power during a bar code decoding, after the presence of a bar code has been detected.

These and other objects of the present invention are provided by methods and systems for conserving power consumption while decoding an optically readable code by taking samples primarily where a data bearing feature is predicted to be proximate. It is not the purpose to predict that a feature will assume a specific value at the location, but to predict the approximate location where the feature exhibits the property that conveys its encoded data value. Thus, sampling is performed on an "as-needed" basis. Sampling is reduced or eliminated between significant feature locations and increased adjacent probable data bearing feature locations.

In an optically readable code, data is contained as conjugates of position and feature property. Some samples may be taken for either component or both components simultaneously. Decoding systems and methods for acquiring optically readable data are thus able to conserve power through most of a read scan because sampling is reduced or withheld when samples are not needed, such as when no data bearing feature is likely to be proximate. It will be understood that the optically readable data codes referred to herein include bar codes as will be explained further in this section. "As needed" sampling can be provided with respect to any feature of an optical data code.

In the case of bar codes there are two principle data bearing features which may be predicted:

1. Boundaries between modules where a change to the other color value (an edge) may occur.
2. The body of a module where its color value is continuous. A module is a unit of a bar code which is the height of the bar code and a length along the bar code of one minimum bar width. A bar code may be thought of as a set of modules adjacent to one another, each of which is of one solid color value throughout. A bar of width equal to two minimum bar widths is thus two adjacent modules of one color value.

There are several types of information about a bar code which may be derived from samples, some of which are:

1. The locations of boundaries (edges lie on module boundaries);
2. The color value of a module (foreground or background);
3. The parity of an edge (white to black or black to white);
4. The module width (minimum bar width, often as a relative time); and
5. Color value calibration (the digitized range of numbers which correspond to each color value.)

Samples may be taken for the purpose of acquiring any of these information types as is needed. Often the samples taken to fill one requirement will fortuitously yield what is required by another. An example of such is when two samples are taken at a module boundary watching for an edge occurrence. If no edge occurs the samples now serve as good information with which to calibrate the color of that bar. Samples may be demanded in a mixed order within limitations well understood by one skilled in the art. It is understood that the phrase, "data bearing feature" will refer to a portion of an optically readable code where an appropriate set of samples of reflectivity and the corresponding relative times will permit acquisition of an item of data or a calibration required to recover data in the context described above.

Physical distances are typically estimated from the time of translation across features such as bars in a sequence. Bars on either side may be used as local references to correct for speed variations. Often the time of each bar as it is decoded is used to correct the estimate for the succeeding bar. In this manner each bar is evaluated as being one or two modules wide. The evaluation then yields a data value such as ONE or ZERO for the bar. Prior art has concentrated on recording the times between edges of the bar code. For this reason the term "bar edges" will be used as the default term when an example could be made using "data bearing features" or various other specific alternatives. It is understood that this is does not exclude any of the alternates which have been identified. The present invention allows the isolation and intermixing of the above possibilities based on prediction of the proximate location of data bearing features as well as any specific knowledge of the bar code format to determine on a real time basis the samples required to acquire the data content of a bar code.

The power required to collect the samples is the sum of the processor power and the power required to execute the sample collection. The processor power tends to be independently optimized and not typically related to the number of samples taken. The power to take the samples may be almost linearly related to the number of samples taken because of the need to pulse a light and energize the necessary circuitry for a period at the time of each sample. There is a reduction in the number of samples and therefore in power.

The process of resolving the location of an edge requires that sampling must begin at the earliest likely time of occurrence and sampling until the latest likely time or until an edge is found. If no edge is present there will be several samples and the process needs to be repeated. Conversely, a single sample at the center of each module will record the module color value and identify that an edge did or did not occur. In the case of a wide bar there are two modules and hence two samples. It is therefore less power demanding to detect an edge as seldom as possible and then sample once per module until the next time an edge position needs to be resolved. If one color value has been seen in the last two modules then an edge must occur at the end of the second module for some codes. It is less power demanding to locate a certain edge occurrence now than to wait a little longer and not be certain. Similarly it may be more effective to re-calibrate edge position at the end of each double wide bar as long as at least a minimum number of modules have passed than to wait a little longer and have to try twice.

A bar code decoding system according to the invention obtains a plurality of samples for a bar code during scanning thereof, preferably at appropriate points so as to contain the bar code data. The obtained samples are converted into a plurality of multi-bit digital words, for example by an analog to digital converter. The bar code is decoded by manipulating the plurality of multi-bit digital words. Some levels of decoding may be done as the samples are taken. A memory stores information related to decoded bar codes. A second memory may be used for storing alphanumeric data which is related to the stored decoded bar codes.

Sampling on an "as needed" basis may be provided by a predictive bar code decoding system and method. Bar edges are detected from the plurality of multi-bit digital values in a first portion of the bar code. At least one data bearing feature is predicted in a second portion of the bar code, based upon the detected bar edges. Sampling of the second portion of the bar code is controlled based upon the at least one predicted data bearing feature. The at least one predicted data bearing feature may be predicted by determining a time and/or distance displacement among the detected bar edges in the first portion of the bar code, and predicting the at least one data bearing feature in the second portion of the bar code from the time and/or distance displacements among the detected bar edges. When the occurrence of a data bearing feature is predicted, sampling can be reduced or eliminated until the predicted occurrence or just before the predicted occurrence. Alternatively, sampling can be increased when a data bearing feature is predicted or just before the occurrence is predicted. Sampling can then be reduced or eliminated temporarily upon detecting the predicted feature.

A predictive method and system according to the present invention can also be used in conjunction with a system and method for identifying a bar code type from the detected bar code features. In response to the detected bar code edges, at least one bar edge occurrence is predicted based on the detected bar code edges and the identified bar code type. The bar code type identification method and system may also be used for controlling sampling of the bar code independent of whether a predictive system and method is used.

A predictive bar code system and method as described above may also be used in conjunction with a system and method for sampling at a first rate in the absence of a substrate containing a bar code and at a second rate, which is higher than the first rate, in the presence of a substrate containing a bar code. Additional power savings can thereby be provided.

The predictive system and method can also be used in conjunction with adaptive thresholds for the black and white data values so that these thresholds are continuously updated in response to detected bar edges. Similarly, time and distance displacement windows for predicting bar edge occurrences may be dynamically updated in response to detected bar edges.

A predictive system and method according to the invention may also be used in conjunction with a system and method which determines that a bar edge occurrence in the second portion of the bar code need not be detected in order to decode the bar code. In response, sampling can be eliminated at the predicted bar edge occurrence if the bar code edge corresponding to the predicted bar edge occurrence need not be detected in order to decode the bar code. Thus, every predicted bar edge need not be sampled if the predicted bar edge need not be decoded in order to decode the bar code. Conversely, if it is determined that the predicted edge may not be accurately located because, for example, excessive time or displacement has elapsed since the last detected edge, the predicted edge occurrence can be sampled even though the predicted bar edge occurrence need not be detected in order to decode the bar code. Accuracy is thereby maintained. The above described system and method for controlling bar code sampling by determining that a bar code edge need not be detected in order to decode the bar code or determining that a bar code edge should be detected even though it is not necessary to decode the bar code, may also be used independent of a system and method for predicting bar edge occurrences.

It will be understood by those having skill in the art that the bar edge detecting, edge occurrence predicting, controlling, bar code type identifying and determining systems and steps are preferably implemented by a microprocessor under stored program control. However, application specific integrated circuits (ASIC) or other digital systems may be used. However, the invention is not limited to digital embodiments. For example, in a second embodiment, a sampling device may be used for obtaining a plurality of samples of the bar code in an analogous manner as that described above, but without digital signal processing. Similarly, an edge detector and an edge predictor can be connected to a controller for controlling the sampling rate of the sampling device based upon the predicted bar edge locations. Accordingly, a displacement determiner for determining displacements among the detected bar edges and a comparing apparatus for comparing the displacements among the detected bar edges may be used to thereby determine the width of bars having the first and second data values in order to decode the bar code. In a like manner, a relative scan speed determiner may be used for determining a relative scan speed across the bar code to aid the edge predictor in predicting bar edge locations. As with the first embodiment, samples may be reduced or withheld when no bar edge is predicted. Hybrid analog/digital systems may also be provided.

A method of decoding a bar code according to the invention obtains a sparse set of samples for the bar code. Sampling on demand is thereby provided. In a preferred method, the plurality of obtained samples are converted into a plurality of multi-bit digital values. Then, the multi-bit digital values are manipulated to decode the bar code.

A manipulating step preferably detects bar edges from the plurality of multi-bit digital values. Once the bar edges are identified, then displacements among the detected bar edges may be determined. The displacements among the detected bar edges may then be compared to determine the width of bars having first and second data values in order to decode the bar code. A preferred method further includes the steps of determining a scan speed across the bar code, predicting bar edge locations, and controlling sampling rate based on the predicted bar edge locations.

Sampling is preferably controlled by reducing or eliminating sampling when no bar edge is predicted. To reduce sampling, a minimum bar width within the bar code is determined and samples are prevented from occurring until a bar edge is likely to be detected. To prevent a sample from occurring, an average time duration necessary to scan a minimum bar width is established. Then, after a bar edge is detected, sampling is withheld for a period of time. When the period of time has elapsed, but prior to the expiration of the time duration necessary to scan a minimum bar width, sampling is resumed to capture the edge of the bar. For example, the step of sampling the bar code may be initiated after about one half to two thirds of a minimum bar width is determined to have passed.

The step of obtaining a plurality of samples for a bar code may be triggered by initiating a sampling of the bar code at a first sampling rate. The first sampling rate may be initiated by user activation of a trigger just before a bar code is presented to a bar code scanner. Then, sampling of the bar code at a second sampling rate, faster than the first sampling rate, may be initiated upon the detection of a reflectivity threshold. The initial reflectivity threshold that is detected is typically the white border surrounding a bar code prior to a first black bar. A third sampling rate, faster than the second sampling rate, may be initiated upon the detection of another reflectivity, that is the first black bar. In addition, the sampling rate may be synchronized to bursts of high energy light to facilitate bar code reading. Power can be conserved by reducing or eliminating sampling when no bar edge is predicted to be detected because a scanner's internal elements, including any high energy light source, need not be powered or energized.

An analog method of decoding a bar code preferably includes the step of obtaining a plurality of samples of the bar code, but without converting the resulting samples into a plurality of multi-bit digital values. Bar edges are then detected from the plurality of samples, and bar edge locations are predicted. Preferably, the method determines a scan speed across the bar code and displacements among the detected bar edges are then determined. After the displacements are compared, the width of bars having the first and second data values may be determined in order to decode the bar code. The sampling rate is then controlled based upon the predicted bar edge locations.

It will be understood by those having skill in the art that systems and methods for decoding bar codes as described above may also be used for decoding any optical data code which includes data encoded in first and second data values as a plurality of optical features. In such a system and method, features, rather than edges, are detected and predicted.

BRIEF DESCRIPTION OF THE DRAWINGS

Some of the objects and advantages of the present invention having been stated, others will be more fully understood from the detailed description that follows, and by reference to the accompanying drawings in which.

DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
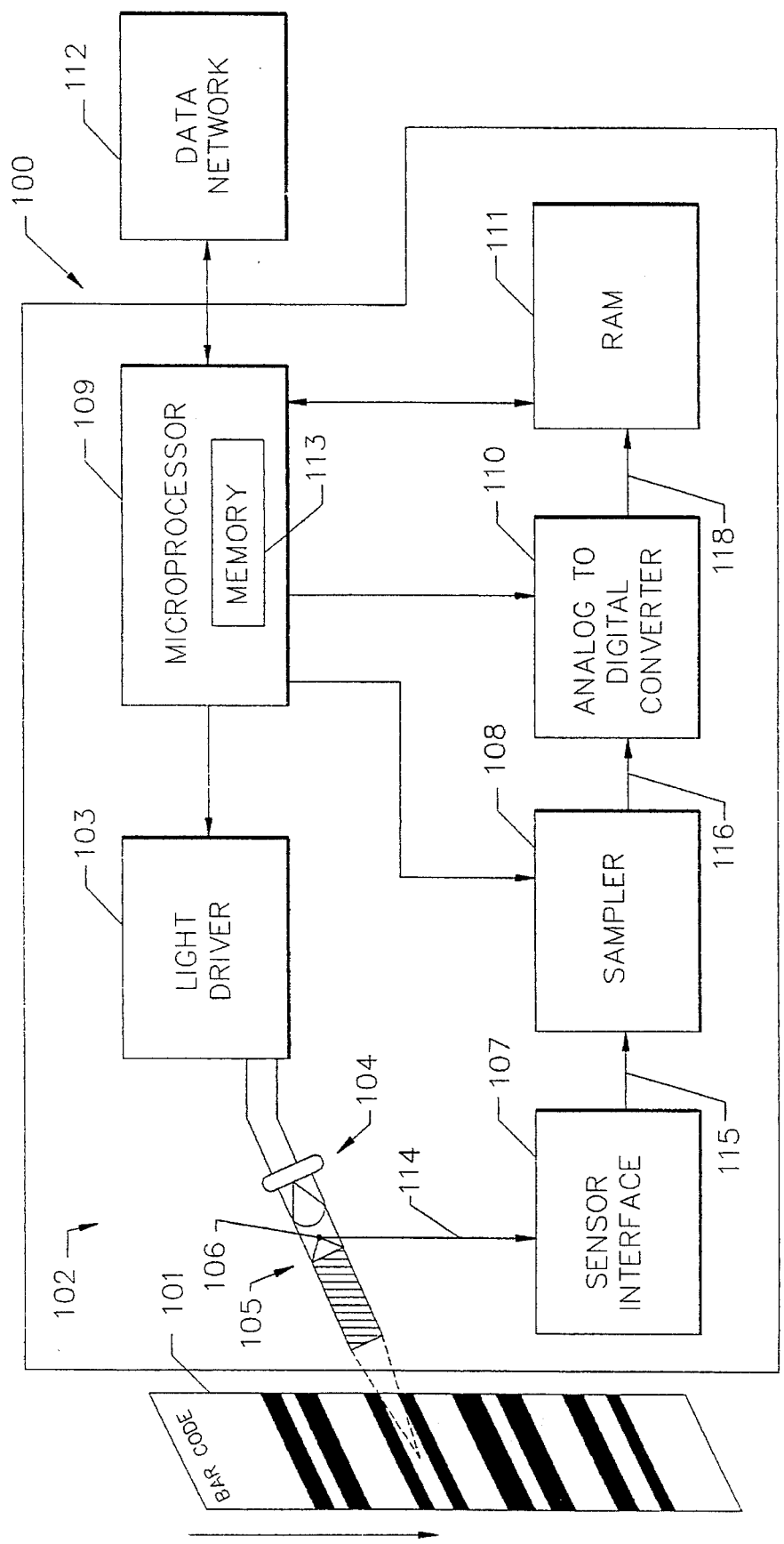
FIG. 1 schematically illustrates a block diagram of a bar code reading system according to the present invention.

Referring to FIG. 1, a bar code reading system, referred to hereinafter as a "scanner" 100, according to the present invention will now be described. A bar code 101 includes a series of black and white bars which have first and second reflectivity coefficients respectively. The reflectivity coefficients of the black and white bars represent first and second data values of the black and white bars. Typically, the width of the individual bars vary to indicate particular code values, but the data values, that is the reflectivity coefficients, of the black and white bars do not vary.

For example, some conventional bar code types are based on a "minimum bar width" and the widths of the black and white bars are multiples of this minimum bar width. There are other bar code types, however, in which there may be a plurality of bar widths which are various multiples of a certain minimum bar width. The design of bar codes is well known to those having skill in the art and will not be described further herein. The present invention will be described with regard to a general bar code design. It will be understood by those having skill in the art that the invention can be used for low power decoding of any bar code or optical data code.

Referring again to FIG. 1, an optical bar code reader 102 makes use of a light driver 103, a light source 104—such as an LED emitter, an optics package 105, and light sensor 106. When the light source 104 is energized, preferably in a pulsed fashion, the optics package 105, which might include a gradient index lens, focuses a beam of light on the bar code 101. The light sensor 106 then detects the light which is reflected back to the bar code scanner 100 and produces an electrical signal output on line 114 that is proportional to the reflected light. A light sensor interface 107 receives the electrical signal output from the light sensor 106 on line 114 and transforms the electrical signal output to a signal on line 115 which is proportional to the reflected light.

A sampler 108 receives the output of the light sensor interface 107 on line 115. A microprocessor 109 directs the sampler 108 to either output its present voltage input, as might a buffer, or output a "held" voltage input on line 116. The sampler 108 is thus able to "slice" the output of the light sensor interface 107 and obtain a signal proportional to the received reflectivity for a precise moment in time. The input of a connector, such as an analog to digital converter 110 is connected to the output of the sampler 108 on line 116. The analog to digital converter 110 converts the signal which is proportional to the received reflectivity into a byte of, for example, eight bits on line 118.

A memory, which may be a random access memory (RAM) 111, receives the digital samples from the analog to digital converter 110 on line 118 under control of the microprocessor 109. The microprocessor 109 then manipulates the plurality of samples for each bar to decode the bar code. Information related to the decoded bar codes may be stored in a second memory 113 within the microprocessor 109 for display or other processing. The second memory 113 may also be used for storing alphanumeric data which is related to the stored decoded bar codes. The microprocessor 109 transmits bar code data to a data network 112 in any manner known to those with skill in the art, including RF, infrared, or direct coupling.

The sampler 108 and the analog to digital converter 110 may be embodied in a flash converter (not shown) or digitizer to produce a totally digital bar code scanner. Thus, when the optical sensor 102 scans a bar code 101, a digitizer can take periodic samples of the electrical output of the optical sensor 107. The amplitude of the electrical signal output may then be converted directly into a byte of, for example, eight bits. The bytes are then stored for later processing or relayed directly to the bar code reader's microprocessor 109 for digital signal processing.

Figure 2:
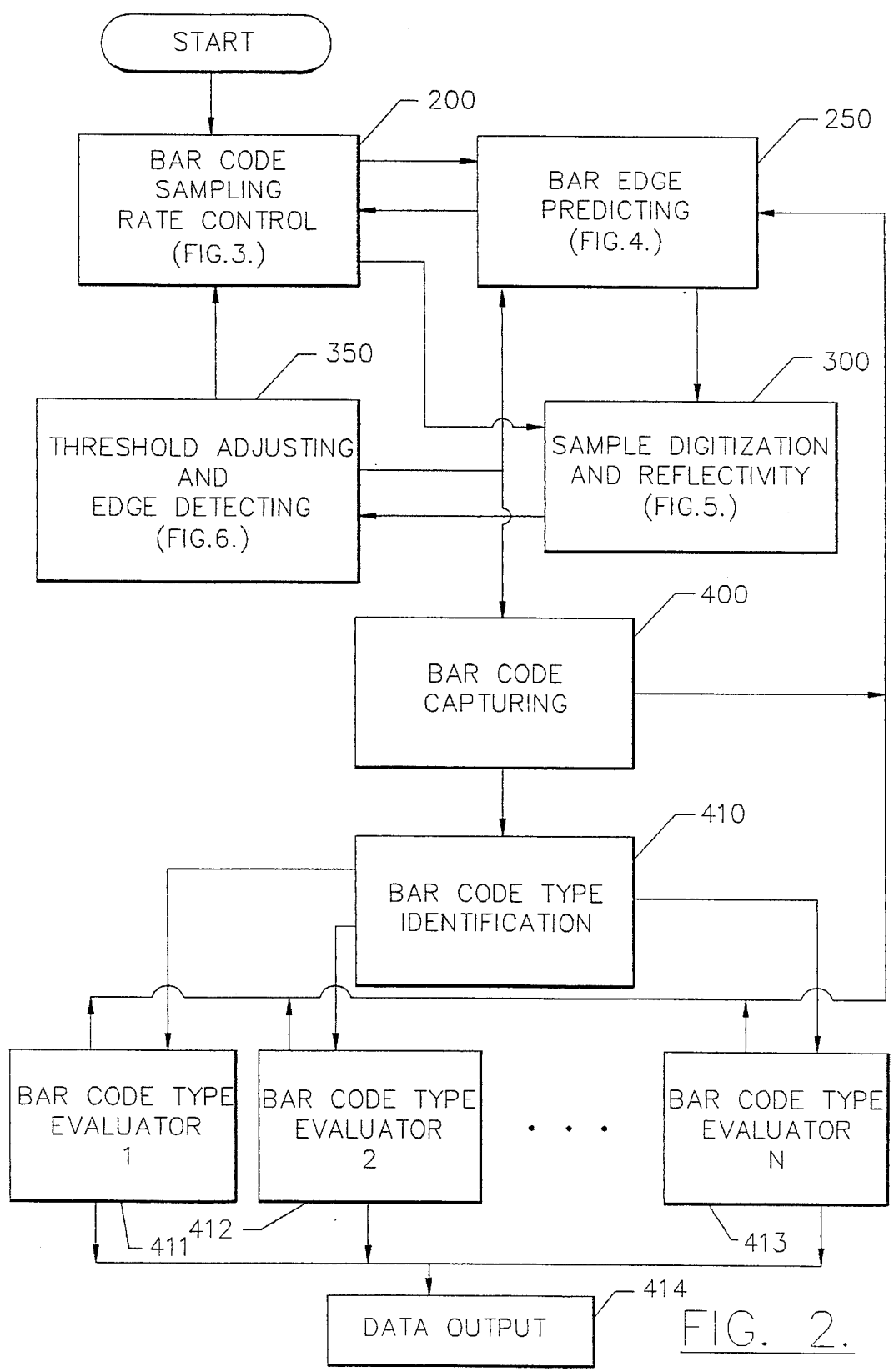
FIG. 2 schematically illustrates operations of the bar code scanner illustrated in FIG. 1.

Referring now to FIG. 2, a schematic illustration of operations of the bar code scanner 100 will now be described. Bar code scanning may be initiated in any number of ways, for example, by depressing a trigger (not shown) on the scanner 100. In any event, upon initialization of a bar code scan, the operations begin with bar code sampling rate control 200. The bar code sampling rate control operation 200 initiates a sampling routine and initially controls operation of the scanner 100. The bar code sampling rate control operation 200 preferably passes control to a bar edge predicting operation 250 at the end of a bar code header. The bar edge predicting operation 250 uses information obtained from the sampling of the header to predict when bar edges will occur.

The bar edge predicting operation 250 may transfer control to a sample digitization and reflectivity operation 300 or back to the bar code sampling rate control operation 200 as each is needed. Following the sample digitization and reflectivity operation 300, a threshold adjust and edge detect operation 350 takes place. The threshold adjust and edge detect operation 350 transfers edge detections to the bar edge predicting operation 250 and a bar code capture operation 400. The threshold adjust and edge detect operation 350 may also transfer control back to the bar code sampling rate control operation 200. The bar code capture operation 400 uses any capture operation known to those with skill in the art which functions on data describing bar edges, reflectivity coefficients, and bar widths. Similarly, the bar code type can be any of the numerous bar codes known and used by those with skill in the art as identified by the bar code type identification operation 410. When a bar code type has been identified from its header information, the bar code type is used by the edge predicting operation to determine decision points of that code type. Accordingly, a variety of identified bar code types may be evaluated, as shown by the bar code type evaluators 411, 412, and 413. A data output 414 is produced and stored, for example, in memory 113 (FIG. 1) for display or transfer of bar code data in any well known manner.

Figure 3:
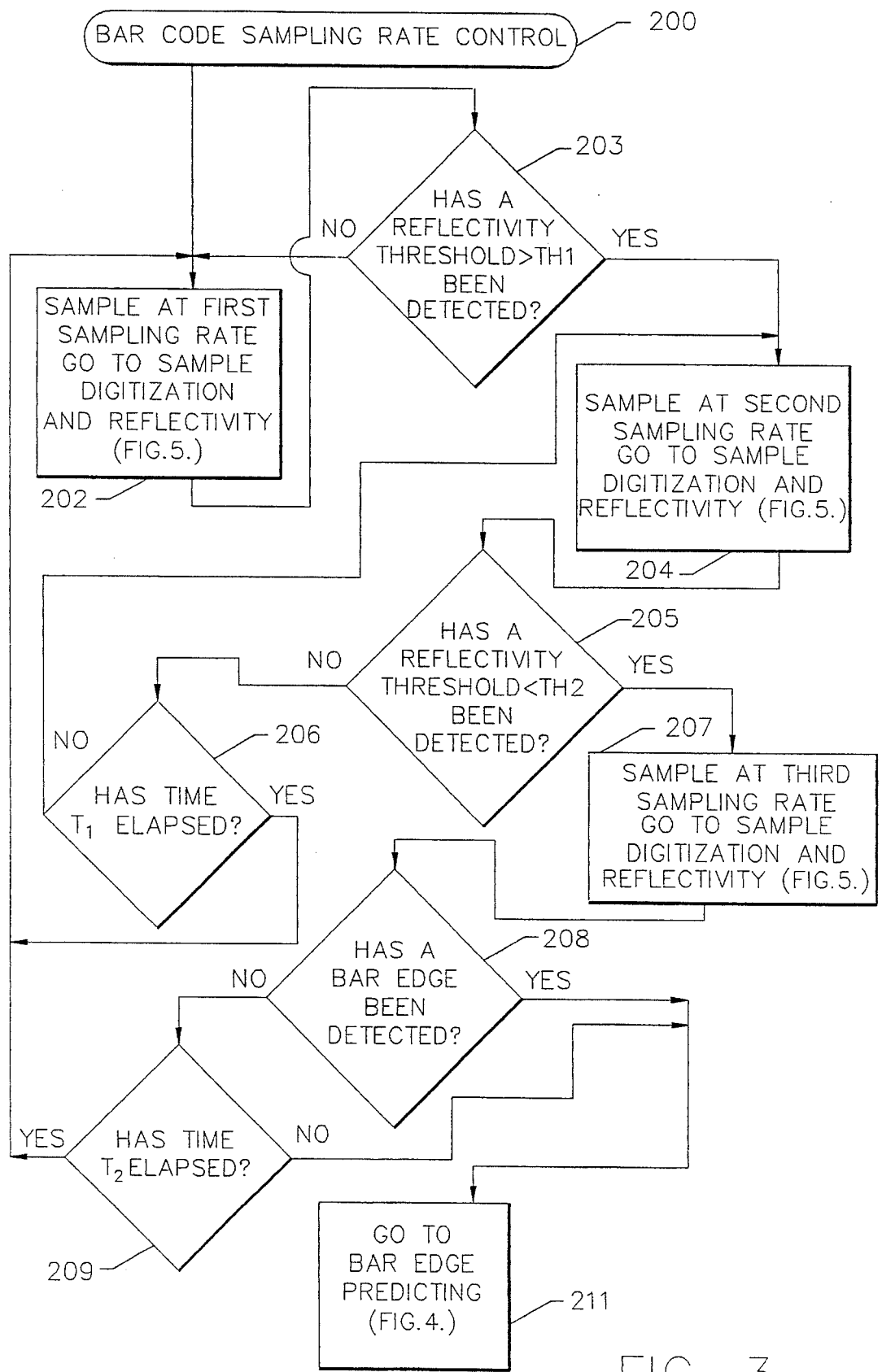
FIG. 3 is a flowchart illustrating bar code sampling operations for the bar code scanner illustrated in FIG. 1.

The bar code sampling rate control operations 200 are more fully illustrated in FIG. 3 and will now be described in greater detail. When the bar code sampling rate control operation 200 is initiated, a first bar code sampling rate may begin. It is controlled by sensed information, that is a white reflective surface.

Figure 7:
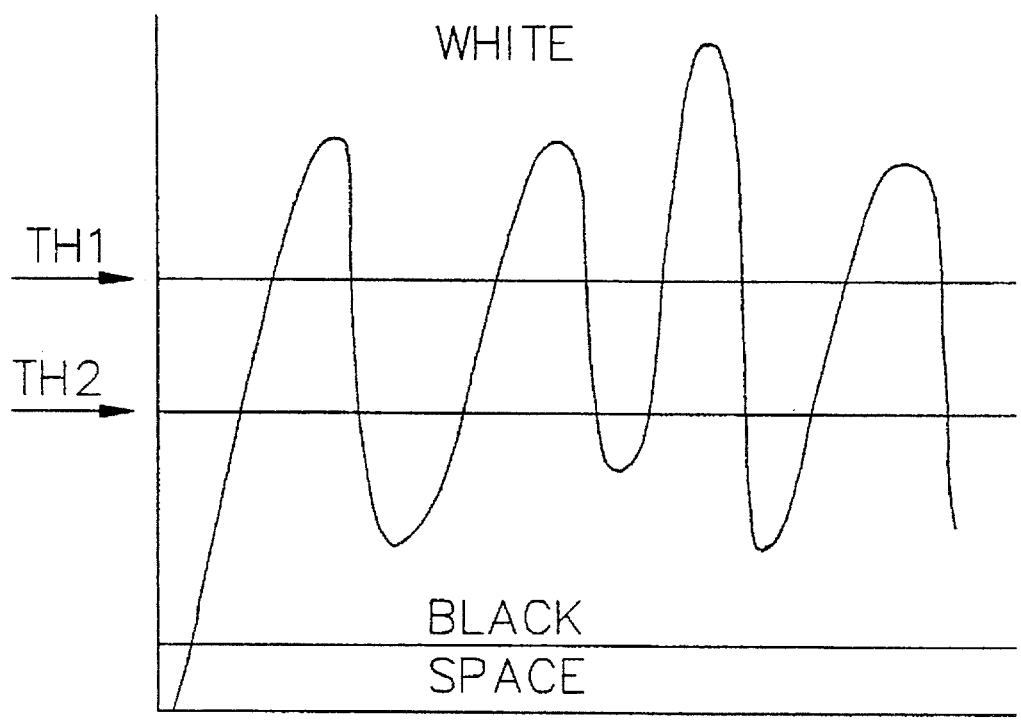
FIG. 7 graphically illustrates the output of the light sensor of FIG. 1 along with an indication of first and second thresholds for bar code reading operations according to the present invention.

Sampling begins at a first sampling rate, at Block 202. Thus, when a user activates the scanner 100, a scanning operation may begin. However, because the placement of the bar code 101 is unknown, the first sampling rate is a slower sampling rate, and may be on the order of five samples per second. Sampling at this rate is continued until a reflectivity which is greater than a white bar's reflectivity threshold is detected or until the user deactivates the scanner. First and second default reflectivity thresholds, corresponding to an average reflectivity coefficient of a white and black bar respectively, are stored in the scanner memory 113. FIG. 7 graphically illustrates the output of the light sensor interface 107 on line 115 (FIG. 1) along with an indication of the first threshold (TH1) and second threshold (TH2). The graph assumes a very high sample rate.

The scanner 100, therefore, is driven by the detection of a reflectivity value. Sampling at the first sampling rate continues until a reflectivity coefficient is detected which is greater than a threshold reflectivity TH1, as indicated at Block 203. Two target threshold reflectivities TH1, TH2 describe reflectivity coefficients from white and black bars respectively. By way of example, reflectivity may be represented as an eight bit number with 256 possible references on a scale between 0 and 255. A typical black reflectivity threshold coefficient TH2 might equal 50 on the reflectivity scale, and a typical white reflectivity coefficient TH1 might equal 150 on the reflectivity scale. Thus, if the reflectivity readings vary in five samples between 148–153 on the reflectivity scale, then all of the samples are within a white bar.

If no reflectivity coefficient is detected which is greater than the white reflectivity threshold TH1, then bar code sampling continues at the first sampling rate until, for example, the scanner trigger is released. If a reflectivity is detected which is greater than the reflectivity threshold TH1, then sampling begins at a second sampling rate, as indicated at Block 204. At this point, the bar code scanner 100 has made contact with the white periphery or boundary area surrounding a bar code 101. The scanner 100 then seeks a reflectivity threshold which is less than the black reflectivity threshold TH2, as indicated at Block 205.

If a reflectivity which is less than the second reflectivity threshold TH2 is not detected after a specified time $T_1$ has elapsed, then the sampling rate moves from the second sampling rate which may be on the order of 100 samples per second back to the first sampling rate, as indicated by Block 206. $T_1$ may be on the order of two seconds. Thus, if the scanner contacts a white label and the bar code 101 is not promptly scanned, then power is not wasted in a higher sampling rate. If a reflectivity less than the second reflectivity threshold TH2 is detected, which may indicate the transition from a white boundary area to a first black bar, then the scanner 100 begins sampling at a third sampling rate at Block 207 which is higher than the second sampling rate. The third sampling rate may be on the order of 10,000 samples per second.

The command to sample at a third sampling rate is followed at Block 208 with a bar edge detect query. If no bar edge has been detected, then, as indicated at Block 209, the sampling rate drops from the third sampling rate down to the first sampling rate after a second period of time $T_2$ has elapsed. $T_2$ may be on the order of 100 milliseconds, which would be longer than the average time necessary for the scanning of any individual bar. If a bar edge is detected, then, as indicated at Block 211, the bar code sampling operation 250 hands over control to the bar edge predicting operation 250 at Block 211.

Figure 4A:
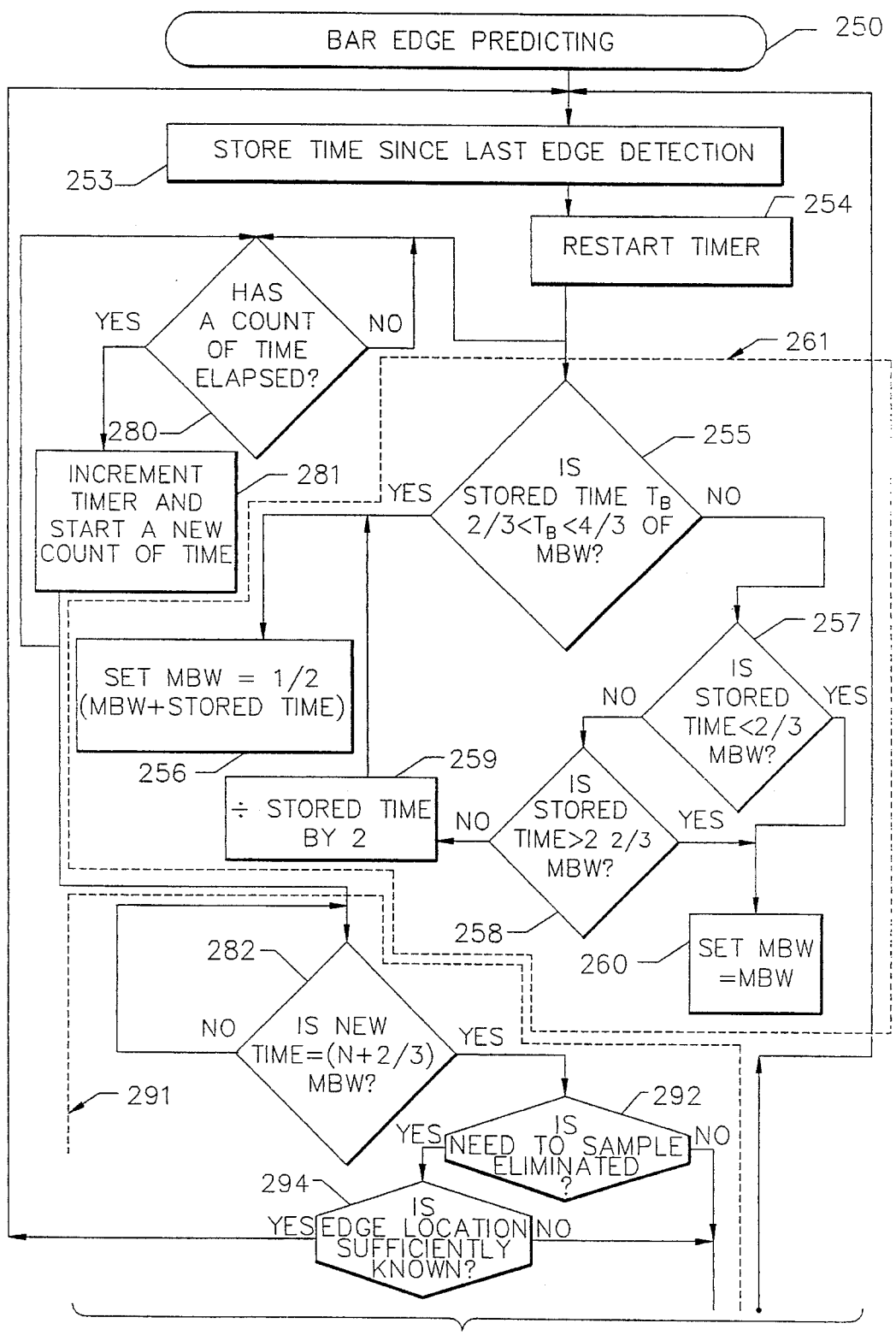
FIGS. 4A and 4B are flowcharts illustrating bar edge predicting operations for the bar code scanner illustrated in FIG. 1.
Figure 4B:
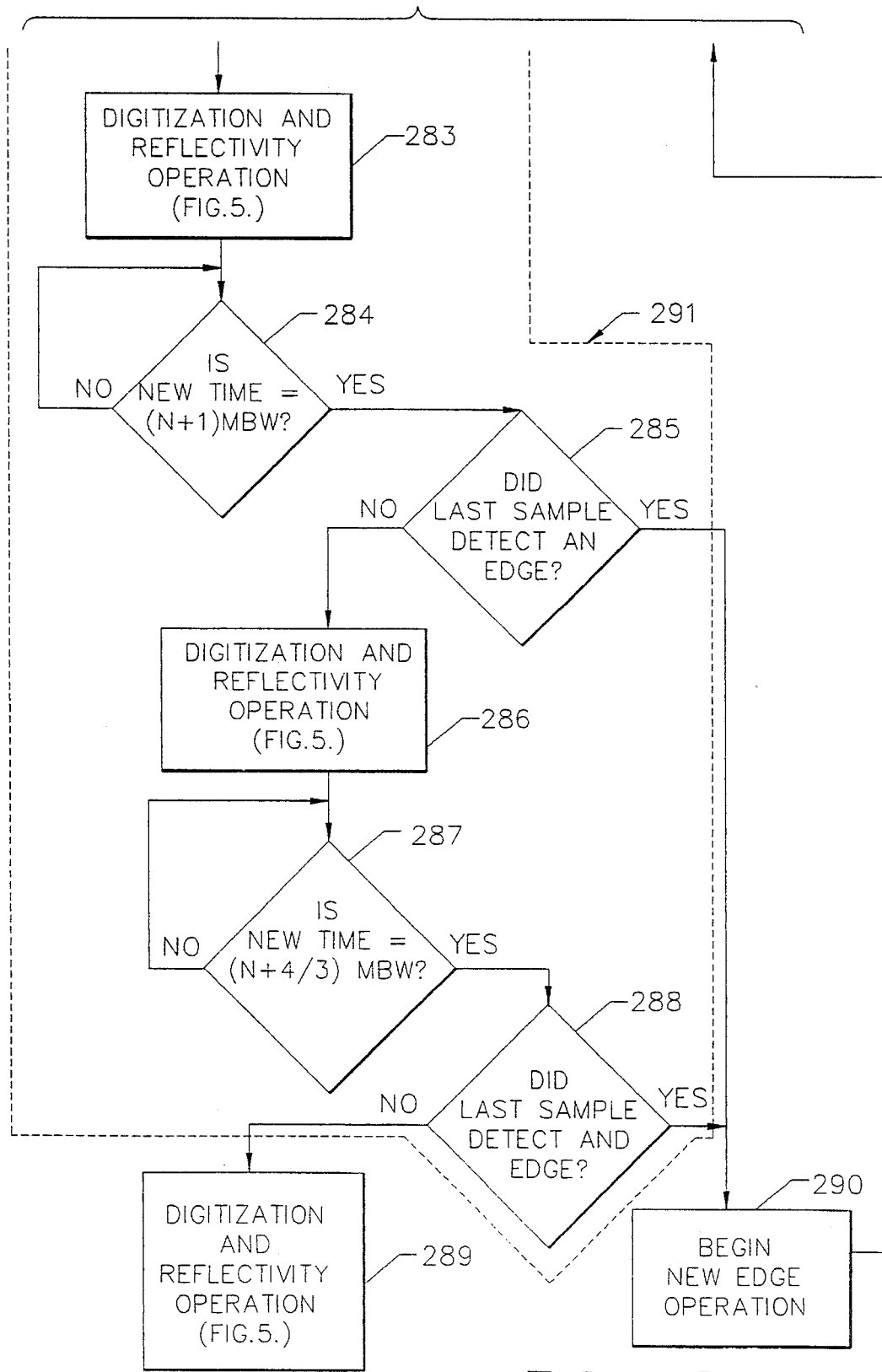

The bar edge predicting operation 250 is illustrated in more detail in FIGS. 4A and 4B. Once a bar edge has been detected, the time since the last edge detection is stored at Block 253, and a timer is restarted at Block 254. A reflectivity operation will be described in greater detail below.

Upon the restarting of the timer, a minimum bar width operation in Block 261 is initiated. The minimum bar width operation 261 re-calibrates the time for scanning a minimum bar width. The time for scanning a minimum bar width is another way of expressing the determination of the scanning speed. Typically, the alternating white and black spaces for most bar codes have a width that is a multiple of a minimum bar width. Thus, a black bar may have a single width, a double width, or a triple width. However, there are some bar codes that are characterized by a plurality of bar widths. Those having skill in the art will recognize that the minimum bar width operation 261 described herein may be adapted to different types of bar codes. The minimum bar width operation 261 illustrated in FIG. 4A is of the type which presumes that a bar code 101 is operating on a minimum bar width principle. Accordingly, the time necessary to scan a minimum bar width may be corrected as bar code scanning is carried out.

The time between bar edges $T_B$ is analyzed at Block 255 to determine if the time taken to scan the bar width is between $\frac{2}{3}$ and $\frac{4}{3}$ of a minimum bar width scan time. The stored bar width time $T_B$ is presumed to equal one bar width if the stored time is between $\frac{2}{3}$ and $\frac{4}{3}$ of the prior minimum bar width scan time. Accordingly, at Block 256, the present minimum bar width scan time (MBW) is set to equal the minimum bar width scan time plus the stored time divided by two. An average minimum bar width approach will accommodate minor speed variations, ink spreading and aberrations in a bar.

If the stored time of the bar is not between $\frac{2}{3}$ and $\frac{4}{3}$ of a minimum bar width, then at Block 257, the minimum bar width operation 261 determines whether the stored time is less than $\frac{2}{3}$ of a minimum bar width. The minimum bar width is set to equal the present minimum bar width value (MBW) at Block 260 if the stored time is greater than $\frac{2}{3}$ of a minimum bar width, at Block 258. When the stored time at Block 258 is not greater than $2\frac{2}{3}$ of a minimum bar width, (since no sample is taken between $N+\frac{1}{3}$ and $N+\frac{2}{3}$), then the stored time is between $1\frac{2}{3}$ and $2\frac{1}{3}$ of a minimum bar width. In other words, the stored time should equal a double bar, or a bar of double the minimum bar width. Accordingly, at Block 259, the stored time is divided by two for a corrected minimum bar width scan time and passed onto Block 256 for an average minimum bar width time adjustment. The minimum bar width operation is repeated after every edge detection when the bar edge predicting operation 250 is in control.

At the same time the minimum bar width operation 261 is initiated upon restart of the timer at Block 254, an edge predicting operation 291 is also begun. At Block 280, the operation queries whether a count of time has elapsed. A timer is incremented and a new count of time is started at Block 281 when a count time is equal to stored time. Referring now to both FIGS. 4A and 4B, it can be seen at Blocks 282, 284, and 287, from an overall perspective, that a sample is initiated when $\frac{2}{3}$ of a minimum bar width has elapsed, when a full minimum bar width has elapsed, and when 4/3 of a minimum bar width has elapsed. Thus, a sample first occurs at 2/3 of a minimum bar width, after the detection of an edge. As described below, if no edge is detected, then another sample is taken at a full minimum bar width. A final sample in the series is taken at 1 1/3 of a minimum bar width if the prior two samples fail to detect a bar edge. Afterwards, samples occur at multiples, or (n+2/3), (n+1), and (n+4/3) of a minimum bar width. Samples are executed at Blocks 283, 286, and 289 by a digitization and reflectivity operation 300 which is described in greater detail below in FIG. 5.

As shown in Block 292, the present invention can also eliminate the need to sample at one minimum bar width from the last edge which was detected, because it can reconstruct the data from the second minimum bar width and the parity information. The individual code type evaluators 411–413 (FIG. 1) can eliminate other edge location sample times because of format.

As shown in Block 294, when a significant number of edges become unneeded consecutively, the distance since the last documented edge position may become too long under the constraints of the application specifications. The predicted edge occurrence may become inaccurate. Thus, if the location is not sufficiently known, the next sample edge time will be sampled, even though it is not needed in order to decode the bar code.

Unsuccessful reads can also be monitored. When two unsuccessful reads occur and are spaced very closely in time, and a third read is initiated, or another planned sequence is initiated, the operation of Block 294 may be performed to allow many samples to be taken and capture the data. That is to say, if the sparse sampling approach is at a disadvantage in one particular case, the system can fall back to a full scan rate or some intermediate rate. This could be necessary in the case of a code being falsely recognized on a systematic basis and therefore skipping some required data bearing feature. A full scan will deliver the complete file to the decoder to be processed.

Although the withholding of sampling is described in terms of eliminating the obtaining of samples, many of the same benefits can be achieved by reducing the rate of sampling when no bar edge is predicted to be probable. The invention thus covers both a rate of sampling reduction when resolution can be compromised and elimination of the sampling step when no bar edge is likely to be detected. Resolution can be reduced, for example, when either the first or second sampling rates are engaged.

When the timer clock reaches a multiple of a minimum bar width time at Blocks 282, 284 and 287, the bar edge predicting operation queries whether the last sample detected an edge, at Blocks 285 and 288. If an edge was detected at 2/3 of a minimum bar width, then as shown at Block 290, a new edge sequence operation begins again. Otherwise, the digitization and reflectivity operation 300 is repeated, as shown at Block 286. Each sample could be a series of samples which may, for example, be spaced at a regular rate in time, or spaced evenly, within the two thirds of the current minimum bar width time period. These samples may begin at 2/3 of a minimum bar width and continue until 1 1/3 of a minimum bar width. The three decision Blocks 282, 284, 287 may be modified to divide the included period into three sampling portions as would be known to those with skill in the art.

When the timer reaches 1 1/3 of a minimum bar width, the edge predicting operation 291 again determines if the last sample operation detected an edge, as indicated at Block 288. If an edge was detected at one minimum bar width, then a new edge operation begins as indicated at Block 290. If no edge was detected, then the operation again takes a sample by going to the digitization and reflectivity operation of FIG. 5 as indicated at Block 289.

Figure 5:
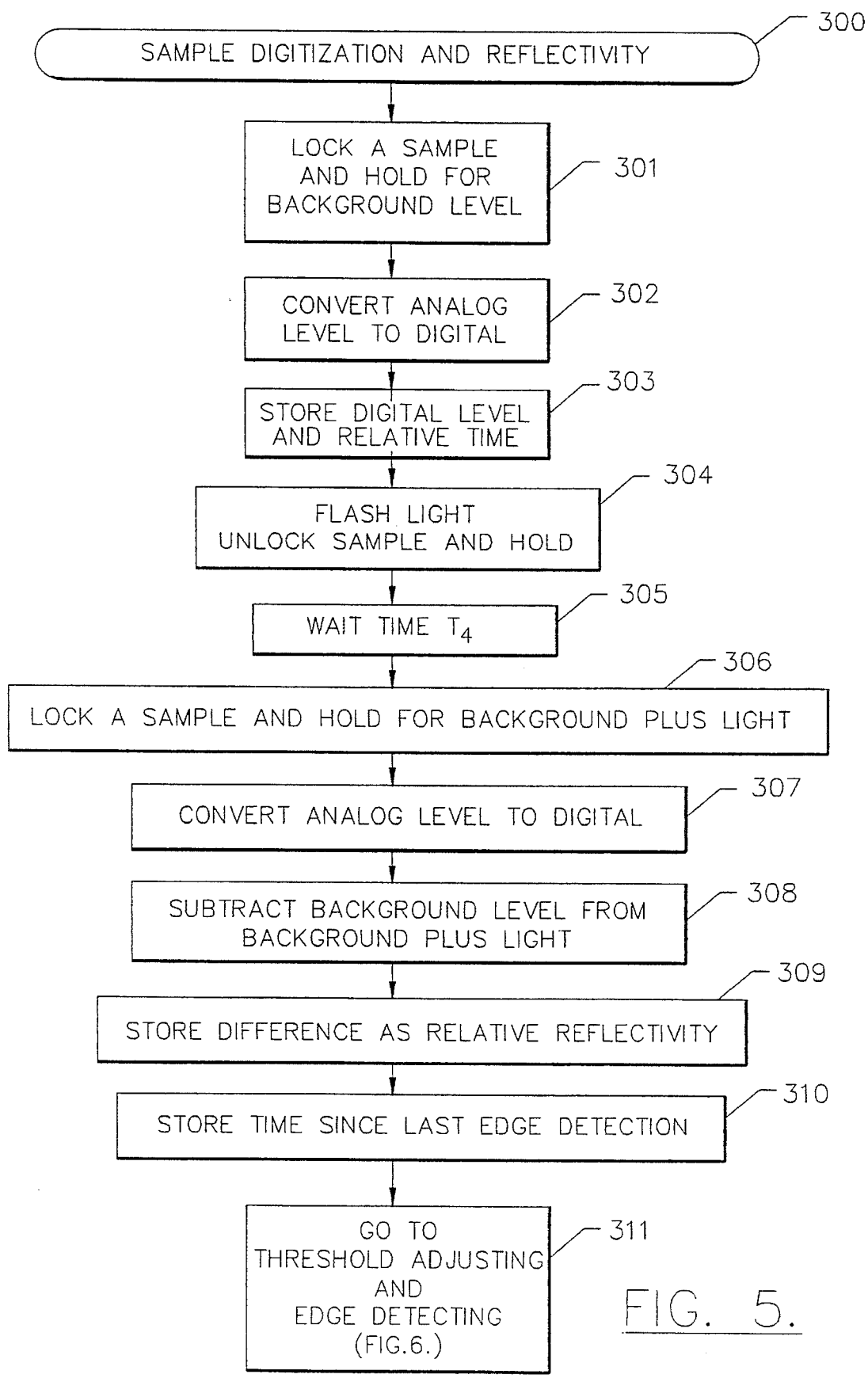
FIG. 5 is a flowchart illustrating sample digitization and reflectivity operations for the bar code scanner illustrated in FIG. 1.

Turning now to FIG. 5, the digitization and reflectivity operation 300 will now be discussed. Keeping in mind that the sample digitization and reflectivity operation 300 is embedded within the edge predicting operation 291, the operation first locks and holds a sample for its background reflectivity level, as indicated at Block 301. The background reflectivity level is then converted from an analog to a digital signal at Block 302. The preferred operation is an all digital operation with all digital processing. Thus, the plurality of samples obtained for a bar code are preferably converted into a plurality of multi-bit digital values and manipulated to decode the bar code 101. The background reflectivity level and relative time are stored at Block 303, then a light is flashed at Block 304 and another sample is taken to capture the sample along with the light after a period of time $T_4$, as indicated at Blocks 305 and 306. The time $T_4$ may be on the order of five microseconds. It will be understood that when sampling a bar code, the sampled reflectivity is stored along with one of the following: (1) a time value (absolute or relative); (2) a current rate of sampling or period between samples; or (3) a new rate of sampling or period in the sample stream upon change of rate. Thus, a location or distance can be determined for the sample.

In the decoding of the bar code 101, the scanner light source 104 is only flashed or energized when called by the first, second or third sampling rates or when a bar edge is predicted, as controlled by the bar edge predicting operation 250. The digitized sample of the background plus light is converted to a digital sample at Block 307. The background reflectivity level is then subtracted from the background plus light reflectivity level and the difference is stored as the relative reflectivity of the sample, as indicated at Block 308 and 309. The sequence of operations which involve sampling the background with light and subtracting the background is an example of a reflectivity capture sequence. There are cases where the background reflectivity is stable, there are cases where the background may be removed as a DC component, and many other situations which may be handled in different ways as would be known by one skilled in the art without affecting the invention. The time since the last edge detection is stored at Block 310, and the sample digitization and reflectivity operation 300 then hands control over to the threshold adjust and edge detecting operation 350, as indicated at Block 311. The time since the last edge detection is the scanning time of the last bar scanned and is thus equal to its bar width value.

Figure 6A:
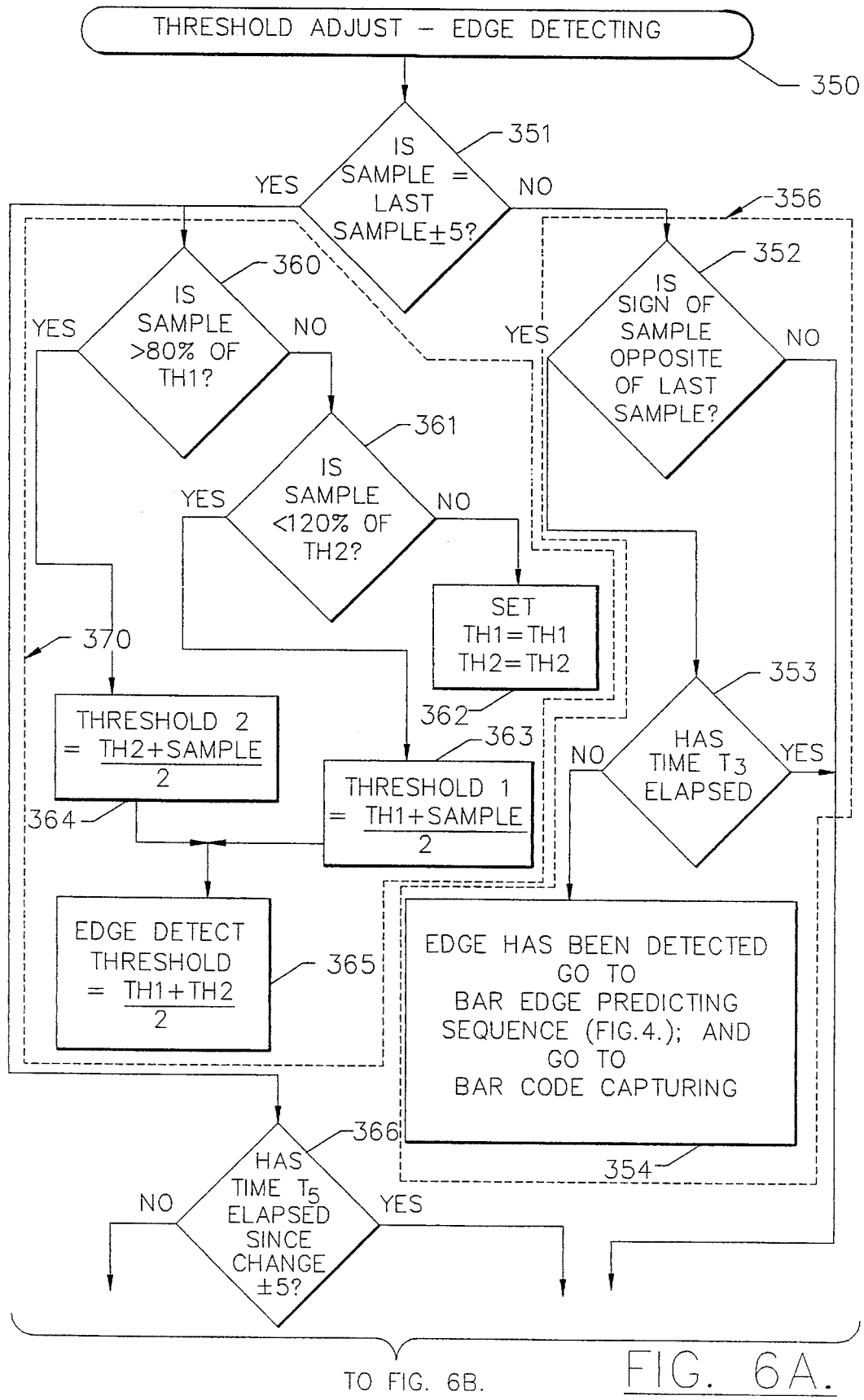
FIGS. 6A and 6B are flowcharts illustrating reflectivity threshold adjust and edge detecting operations for the bar code scanner illustrated in FIG. 1.
Figure 6B:
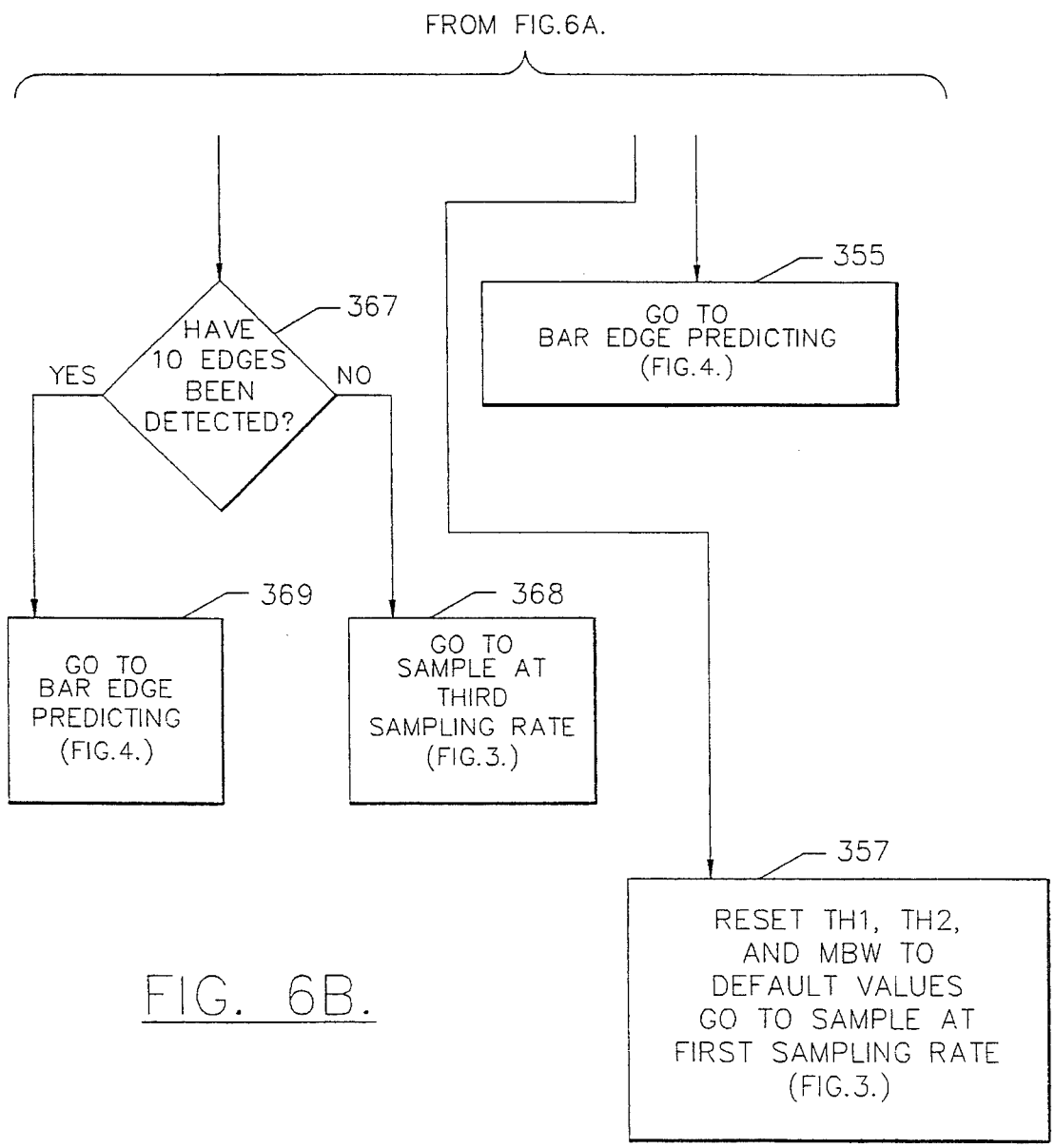

The threshold adjust and edge detecting operation 350 is illustrated in greater detail in FIGS. 6A and 6B. In particular, an edge detecting operation is performed in Block 356 and a reflectivity adjusting operation is performed in Block 370. By itself, the term "threshold" as used herein is meant to describe the midpoint between the two reflectivities TH1 and TH2. For example, reflectivity may be represented as an eight bit number with 256 possible states. A typical black reflectivity coefficient might equal 50 on the reflectivity scale, and a white reflectivity coefficient might equal 150 on the reflectivity scale. Thus, if the reflectivity readings vary in five samples between 148–153 on the reflectivity scale, then all of the samples are within a white bar. As samples are taken during a bar code scan, the reflectivity threshold values are updated.

In the context of 50 for a reflectivity coefficient for a typical black bar and 150 for a reflectivity coefficient for a typical white bar, the edge detect threshold, at Block 365, would typically be a reflectivity coefficient of 100. Thus, each sample would have 100 subtracted from it and its sign extracted to determine its value as "black" or "white." When the received reflectivity jumps between samples on the reflectivity scale from, for example, 48 to 151, then that is termed a "change in sign" and signifies the detection of a bar edge. Accordingly, at Block 351, the first query is whether the present sample is within ±5 of the last sample. The ±5 range is meant to indicate a reasonable range of reflectivity readings when the optical sensor 102 is pointing into empty space. If all the samples over a sufficient period show small variations, then, as discussed below, the scanner will return to sampling at the first sampling rate. Of course, such a range may be altered to take into account various characteristics of the intended environment. In other words, if the present reflectivity range is 50 to 150 and the last sample was 50 (indicating a black bar sample), is the present sample greater than 100, the present edge detection threshold.

When the sign of the present sample is opposite of the last sample, then, as indicated at Blocks 353 and 354, an edge will have been detected if the transition occurred within a specified time $T_3$, which may be on the order of 100 milliseconds. Once an edge has been detected, an edge detection signal is transmitted to both the bar code capture operation 400 and the bar edge predicting operation 250, as shown at Block 354. Control of the overall operation of the bar code scanner 100 transfers to the bar edge predicting operation 250 until no more bar edges are detected.

In some cases, the sign of the sample will be opposite of the last sample, but the time between edges will be greater than $T_3$. Then, the edge detecting operation 356 hands control back to the bar edge predicting operation 291 of FIG. 4 at its entry point. In essence, the sample was deemed an aberration, or a wider bar used for other purposes, and the bar edge predicting operation 291 continues uninterrupted.

When the sample is within ±5 of the last sample, then a threshold adjusting operation 370 takes place, as shown by Blocks 360–365. When a current sample is less than TH1, the white bar threshold, and greater than TH2, the black bar threshold, then the sample will be considered an intermediate value and TH2 remain unchanged, as illustrated by Blocks 360, 361, and 362. An intermediate value may be defined, for example, when the sample is less than 80% of the reflectivity coefficient of TH1 and is greater than 120% of the reflectivity coefficient of TH2. When the reflectivity range is near TH1 or TH2, the reflectivity threshold value is adjusted. Block 363 shows that a current sample within the ±5 range which is less than 120% of TH2, i.e. within the white, is added to the current TH2 and divided by two for a new TH2 value. Block 364 shows that a current sample within the ±5 range that is greater than 80% of TH1, but within the ±5 range, i.e. within the black, is added to the current TH1 and divided by two for a new TH1 value. After either reflectivity threshold is adjusted, the edge detect threshold is adjusted, at Block 365, by adding the new reflectivity threshold to the old reflectivity threshold, the sum of which is divided by two.

While the threshold adjusting operation 370 is running, the timer clock is being monitored, as indicated by Block 366. When a certain time, $T_5$, has passed, an inquiry is made whether 10 edges have been detected at Block 367. The time $T_5$ is preferably 100 milliseconds, but may be changed independent of other pauses even though they may preferably be 100 milliseconds as well. The 10 edge inquiry is meant to allow the scanner 100 to use the bar code header portion to adjust threshold, reflectivity, and scan speed for predicting bar edge locations. However, a partial header or other criteria could be used during the scanner's initialization routine. The present invention is being described with reference to a bar code 101 that makes use of the minimum bar width structure and a header of nine bars with a total of ten edges.

When ten edges have been detected, Block 369 directs that control be handed over to the bar edge predicting operation 250. When control is handed over at this point, 100 milliseconds have not elapsed, thus the reader is in an ongoing bar code capture procedure, but the sampling routine is past the bar code header. Therefore, the bar edge predicting operation 250 takes over. If ten edges have not been detected, then the scanner 100 continues sampling at the third sampling rate of the bar code sampling rate control operation 200 as indicated at Block 368. Upon the passing of time $T_5$ along with no change greater than ±5 in the reflectivity, the reflectivity thresholds TH1 and TH2 and the minimum bar width value are reset to their respective default values at Block 357, and sampling is resumed at the first sampling rate in FIG. 3.

In a preferred embodiment of the scanner 100, the manipulating, scan speed determining, edge predicting, and control operations are all implemented by the microprocessor 109 under stored program control. Accordingly, an edge detecting means may be implemented by performing edge detecting operations 356 for detecting bar edges from the plurality of multi-bit digital values. Similarly, a scan speed determining means and an edge predicting means may be implemented by performing edge predicting operation 291 for predicting bar edge locations. The microprocessor 109 is also a controlling means for controlling the sampling rate based upon the predicted bar edge locations.

As discussed above, bar code edge detections are passed on to the bar code capture operation 400 at the same time bar code information is detected via the edge detecting operation 356. Bar code capture operations and the subsequent identification and evaluation of bar code information is well known to those with skill in the art and need not be discussed further.

The overall operations described above will now be summarized. Operations begin by sampling reflectivity at a low rate while waiting for input. This occurs when the scanner is energized without a reflective surface (such as a substrate including a bar code) in focus. The samples include a reflectivity and a time or rate. The presence of a background color (white) surface is recognized and the rate of sampling is increased so as to sample during the presence of the first bar of a foreground color (black) surface. Then, sampling is performed at a sufficient rate to locate the positions of the next several edges with a resolution that will permit the determination of the local minimum bar width. From these samples, the times when no new edge is possible are determined based on the minimum width which has been determined and the uncertainty regarding position. Samples (reflectivity and time) are then taken at the times when an edge is predicted. Extra samples are taken if edge position moves out of the expected window. The reflectivity values of the foreground and background colors are updated dynamically and the minimum bar width time is also updated dynamically.

Distinguishing features which are necessary to determine the actual bar code type are recognized. Having determined a bar code type, decision points for that bar code type are determined. Tags that differ from the selected format are rejected. Only those bars which are specified on the selected template based on the determined bar code format are sampled. If position becomes uncertain, extra samples are taken to de-synchronize. Samples are thus taken sparsely to save power by only sampling at such times as to capture such edge positions, and their preceding and succeeding colors, that are required to capture the desired data of the code. Bar code scanning in an energy efficient and processing efficient manner is thereby provided.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A system for decoding a bar code, the bar code having data encoded in at least first and second data values as a plurality of bars, said system comprising:

means for obtaining a plurality of samples of the bar code during scanning thereof;

means for detecting bar edges in a first portion of the bar code from the plurality of samples, said edge detecting means being responsive to said sample obtaining means;

means for predicting at least one bar edge occurrence in a second portion of the bar code, said edge predicting means being responsive to said edge detecting means; and means for controlling sampling of said second portion of the bar code by said sample obtaining means, based upon the at least one predicted bar edge occurrence, said controlling means being responsive to said edge predicting means.

2. A system according to claim 1 wherein said edge predicting means comprises:

means for determining at least one of time and distance displacements among the detected bar edges in the first portion of the bar code; and means for predicting the at least one bar edge occurrence in the second portion of the bar code, from the at least one of time and distance displacements among the detected bar edges.

3. A system according to claim 1 wherein said controlling means comprises means for reducing sampling by said sample obtaining means when a bar edge occurrence is not predicted.

4. A system according to claim 1 wherein said controlling means comprises means for eliminating sampling by said sample obtaining means when a bar edge occurrence is not predicted.

5. A system according to claim 1 wherein said controlling means comprises means for increasing sampling by said sample obtaining means when a bar edge occurrence is predicted.

6. A system according to claim 5 wherein said sampling increasing means comprises means for increasing sampling immediately prior to when a bar edge occurrence is predicted.

7. A system according to claim 5 wherein said controlling means further comprises means for reducing sampling upon detecting a bar edge.

8. A system according to claim 7 wherein said reducing means comprises means for eliminating sampling upon detecting an edge.

9. A system according to claim 1 further comprising:

means for identifying a bar code type from the detected bar edges, said bar code type identifying means being responsive to said edge detecting means; and wherein said edge predicting means is further responsive to said bar code identifying means, for predicting said at least one bar edge occurrence based upon the identified bar code type.

10. A system according to claim 1 further comprising memory means, connected to said controlling means, for storing information related to decoded bar codes.

11. A system according to claim 10 further comprising second memory means, associated with said memory means, for storing alphanumeric data representing a decoded bar code.

12. A system according to claim 1 wherein said edge detecting means, said edge predicting means and said controlling means are all implemented by a microprocessor under stored program control.

13. A system according to claim 1 wherein said controlling means controls said sample obtaining means to sample at a first rate, in the absence of a substrate containing a bar code, and at a second rate, which is higher than said first rate, in the presence of a substrate containing a bar code.

14. A system according to claim 1 wherein said edge detecting means further comprises means for updating a reflectivity threshold for at least one of said at least first and second data values in response to the detected bar edges.

15. A system according to claim 2 wherein said determining means dynamically updates said at least one of time and distance displacements in response to detected edges.

16. A system according to claim 1 further comprising:

means for determining that at least one bar edge occurrence in said second portion of said bar code need not be detected in order to decode said bar code, said determining means being responsive to said edge detecting means; and wherein said controlling means is responsive to said determining means and to said edge predicting means, for eliminating sampling by said sample obtaining means at said predicted bar edge occurrence when a bar code edge corresponding to said predicted bar edge occurrence need not be detected in order to decode said bar code.

17. A system according to claim 16 further comprising second means for determining that said predicted edge occurrence may not be accurate; and wherein said controlling means is further responsive to said second determining means, for controlling said sample obtaining means to sample at said predicted edge occurrence notwithstanding that said predicted bar edge occurrence need not be detected in order to decode said bar code, if said predicted edge occurrence may not be accurate.

18. A system for decoding a bar code, the bar code having data encoded in at least first and second data values as a plurality of bars, said system comprising:

means for obtaining a plurality of samples of the bar code during scanning thereof;

means for detecting bar edges in a first portion of the bar code from the plurality of samples, said edge detecting means being responsive to said sample obtaining means;

means for identifying a bar code type from the detected bar edges, said bar code type identifying means being responsive to said edge detecting means; and means for controlling sampling of said second portion of the bar code by said sample obtaining means, based upon the identified bar code type, said controlling means being responsive to said bar code type identifying means.

19. A system according to claim 18 wherein said controlling means comprises means for reducing sampling by said sample obtaining means based upon the identified bar code type.

20. A system according to claim 18 wherein said controlling means comprises means for eliminating sampling by said sample obtaining means based upon the identified bar code type.

21. A system according to claim 18 wherein said controlling means comprises means for increasing sampling by said sample obtaining means based upon the identified bar code type.

22. A system for decoding a bar code, the bar code having data encoded in at least first and second data values as a plurality of bars, said system comprising:
   means for obtaining a plurality of samples of the bar code during scanning thereof;
   means for detecting bar edges in a first portion of the bar code from the plurality of samples, said edge detecting means being responsive to said sample obtaining means;
   means for determining that at least one bar edge occurrence in a second portion of said bar code need not be detected in order to decode said bar code, said determining means being responsive to said edge detecting means; and
   means for controlling sampling of said second portion of the bar code by said sample obtaining means, when a bar code edge need not be detected in order to decode said bar code, said sample controlling means being responsive to said determining means.

23. A system according to claim 22 wherein said controlling means comprises means for reducing sampling by said sample obtaining means when a bar code edge need not be detected in order to decode said bar code.

24. A system according to claim 22 wherein said controlling means comprises means for eliminating sampling by said sample obtaining means when a bar code edge need not be detected in order to decode said bar code.

25. A system for decoding a bar code, the bar code having data encoded in first and second data values as a plurality of bars, said system comprising:
   means for obtaining a plurality of samples of the bar code during scanning thereof; and
   means for controlling sampling of said bar code on demand, by reducing sampling of said bar code by said sample obtaining means between possible bar edge locations and by increasing sampling of said bar code by said sample obtaining means adjacent possible bar edge locations.

26. The system of claim 25 wherein said controlling means eliminates sampling of said bar code by said sample obtaining means between possible bar edge locations.

27. A system for decoding an optical data code, the optical data code having data encoded in at least first and second data values as a plurality of optical features, said system comprising:
   a sampler which obtains a plurality of samples of the optical data code during scanning thereof;
   a feature detector which detects optical features in a first portion of the optical data code from the plurality of samples, said feature detector being responsive to said sampler;
   a feature predictor which predicts at least one feature occurrence in a second portion of the optical data code, said feature predictor being responsive to said feature detector; and
   a controller which controls sampling of said second portion of the optical data code by said sampler, based upon the at least one predicted feature occurrence, said controller being responsive to said feature predictor.

28. A system according to claim 27 wherein said feature predictor comprises:
   a displacement determiner which determines at least one of time and distance displacements among the detected features in the first portion of the bar code; and
   wherein the feature predictor predicts the at least one feature occurrence in the second portion of the optical data code, from the at least one of time and distance displacements among the detected optical features.

29. A system according to claim 27 wherein said controller reduces sampling by said sampler when a feature occurrence is not predicted.

30. A system according to claim 27 wherein said controller eliminates sampling by said sampler when a feature occurrence is not predicted.

31. A system according to claim 27 wherein said controller increases sampling by said sampler when a feature occurrence is predicted.

32. A system according to claim 31 wherein said controller further increases sampling by said sampler immediately prior to when a feature occurrence is predicted.

33. A system according to claim 31 wherein said controller reduces sampling by said sampler upon detecting a feature.

34. A system according to claim 33 wherein said controller further eliminates sampling by said sampler upon detecting a feature.

35. A system according to claim 27 further comprising:
   an optical code type identifier, which identifies an optical code type from the detected features; and
   wherein said feature predictor is further responsive to said optical code type identifier, to predict said at least one feature occurrence based upon the identified optical code type.

36. A system according to claim 27 further comprising a memory, connected to said controller, for storing information related to decoded optical codes.

37. A system according to claim 36 further comprising a second memory, associated with said memory, for storing alphanumeric data representing a decoded optical code.

38. A system according to claim 27 wherein said feature detector, said feature predictor and said controller are all implemented by a microprocessor under stored program control.

39. A system according to claim 27 wherein said controller controls said sampler to sample at a first rate, in the absence of a substrate containing an optical data code, and at a second rate, which is higher than said first rate, in the presence of a substrate containing an optical data code.

40. A system according to claim 27 wherein said edge detector updates a reflectivity threshold for at least one of said at least first and second data values in response to the detected features.

41. A system according to claim 28 wherein said displacement determiner dynamically updates said at least one of time and distance displacements in response to a detected feature.

42. A system according to claim 27 further comprising:

a second determiner which determines that at least one feature occurrence in said second portion of said optical data code need not be detected in order to decode said optical data code; and wherein said controller is responsive to said second determiner and to said feature predictor, to eliminate sampling by said sampler at said predicted feature occurrence when a feature corresponding to said predicted feature occurrence need not be detected in order to decode said optical data code.

43. A system according to claim 42 further comprising a third determiner which determines that said predicted feature occurrence may not be accurate; and wherein said controller is further responsive to said third determiner, to control said sampler to sample at said predicted feature occurrence notwithstanding that said predicted feature occurrence need not be detected in order to decode said optical data code, if said predicted feature occurrence may not be accurate.

44. A system for decoding an optical data code, the optical data code having data encoded in at least first and second data values as a plurality of optical features, said system comprising:

a sampler which obtains a plurality of samples of the optical data code during scanning thereof;

a feature detector which detects optical features in a first portion of the optical data code from the plurality of samples, said feature detector being responsive to said sampler;

an optical code type identifier which identifies an optical code type from the detected features, said identifier being responsive to said feature detector; and a controller which controls sampling of a second portion of the optical data code by said sampler, based upon the identified optical data code type, said controller means being responsive to said optical data code type identifier.

45. A system according to claim 44 wherein said controller reduces sampling by said sampler based upon the identified optical data code type.

46. A system according to claim 44 wherein said controller eliminates sampling by said sampler based upon the identified optical data code type.

47. A system according to claim 44 wherein said controller increases sampling by said sampler based upon the identified optical data code type.

48. A system for decoding an optical data code, the optical data code having data encoded in at least first and second data values as a plurality of optical features, said system comprising:

a sampler which obtains a plurality of samples of the optical data code during scanning thereof;

a feature detector which detects optical features in a first portion of the optical data code from the plurality of samples, said feature detector being responsive to said sampler;

a determiner which determines that at least one feature occurrence in a second portion of said optical data code need not be detected in order to decode said optical code, said determiner being responsive to said feature detector; and a controller which controls sampling of said second portion of the optical data code by said sampler, when a feature need not be detected in order to decode said optical data code, said controller being responsive to said determiner.

49. A system according to claim 48 wherein said controller reduces sampling by said sampler when an optical data code feature need not be detected in order to decode said optical data code.

50. A system according to claim 48 wherein said controller eliminates sampling by said sampler when a feature need not be detected in order to decode said optical data code.

51. A system for decoding an optical data code, the optical data code having data encoded in at least first and second data values as a plurality of optical features, said system comprising:

a sampler which obtains a plurality of samples of the optical data code during scanning thereof; and a controller which controls sampling of said optical data code on demand, by reducing sampling of said optical data code by said sampler between possible feature locations and by increasing sampling of said optical data code by said sampler adjacent possible feature locations.

52. The system of claim 51 wherein said controller eliminates sampling of said optical data code by said sampler between possible feature locations.

53. A method for decoding a bar code, the bar code having data encoded in at least first and second data values as a plurality of bars, said method comprising the steps of:

obtaining a plurality of samples of the bar code during scanning thereof;

detecting bar edges from the plurality of samples;

predicting a bar edge location from the detected bar edges; and controlling sampling of the bar code between the bar edges and the predicted bar edge location.

54. A method according to claim 53 wherein said predicting step comprises the steps of:

determining at least one of time and distance displacements among the detected bar edges; and predicting the bar edge location from the at least one of time and distance displacements among the detected bar edges.

55. A method according to claim 53 wherein said controlling step comprises the step of reducing sampling when a bar edge location is not predicted.

56. A method according to claim 53 wherein said controlling step comprises the step of eliminating sampling when a bar edge location is not predicted.

57. A method according to claim 53 wherein said controlling step comprises the step of increasing sampling when a bar edge location is predicted.

58. A method according to claim 57 wherein said sampling increasing step comprises the step of increasing sampling immediately prior to when a bar edge location is predicted.

59. A method according to claim 57 wherein said controlling step further comprises the step of reducing sampling upon detecting a bar edge.

60. A method according to claim 59 wherein said reducing step comprises the step of eliminating sampling upon detecting a bar edge.

61. A method according to claim 53 further comprising the step of:

identifying a bar code type from the detected bar edges; and wherein said predicting step predicts said at least one bar edge location based upon the identified bar code type.

62. A method according to claim 53 further comprising the step of storing information related to decoded bar codes.

63. A method according to claim 62 further comprising the step of storing alphanumeric data representing a decoded bar code.

64. A method according to claim 53 wherein said detecting step, said predicting step and said controlling step are all implemented by a microprocessor under stored program control.

65. A method according to claim 53 wherein said controlling step controls sampling of the bar code at a first rate, in the absence of a substrate containing a bar code, and at a second rate, which is higher than said first rate, in the presence of a substrate containing a bar code.

66. A method according to claim 53 wherein said edge detecting step further comprises the step of updating a reflectivity threshold for at least one of said first and second data values in response to the detected bar edges.

67. A method according to claim 54 wherein said determining step dynamically updates said at least one of time and distance displacements in response to a detected edge.

68. A method according to claim 53 further comprising the step of:

determining that the predicted bar edge location need not be detected in order to decode said bar code; and wherein said controlling step comprises the step of eliminating sampling at said predicted bar edge location when a bar code edge corresponding to said predicted bar code location need not be detected in order to decode said bar code.

69. A method according to claim 68 further comprising the step of determining that said predicted edge location may not be accurate; and wherein said controlling step comprises the step of sampling at said predicted edge location notwithstanding that said predicted bar edge location need not be detected in order to decode said bar code, if said predicted edge location may not be accurate.

70. A method for decoding a bar code, the bar code having data encoded in at least first and second data values as a plurality of bars, said method comprising the steps of:

obtaining a plurality of samples of the bar code during scanning thereof;

detecting bar edges from the plurality of samples;

identifying a bar code type from the detected bar edges; and controlling sampling of the bar code, based upon the identified bar code type.

71. A method according to claim 70 wherein said controlling step comprises the step of reducing sampling based upon the identified bar code type.

72. A method according to claim 70 wherein said controlling step comprises the step of eliminating sampling based upon the identified bar code type.

73. A method according to claim 70 wherein said controlling step comprises the step of increasing sampling based upon the identified bar code type.

74. A method for decoding a bar code, the bar code having data encoded in at least first and second data values as a plurality of bars, said method comprising the steps of:

obtaining a plurality of samples of the bar code during scanning thereof;

detecting bar edges from the plurality of samples;

determining that at least one bar edge occurrence in said bar code need not be detected in order to decode said bar code; and controlling sampling of the bar code when a bar code edge need not be detected in order to decode said bar code.

75. A method according to claim 74 wherein said sample controlling step comprises the step of reducing sampling when a bar code edge need not be detected in order to decode said bar code.

76. A method according to claim 74 wherein said sample controlling step comprises the step of eliminating sampling when a bar code edge need not be detected in order to decode said bar code.

77. A method for decoding a bar code, the bar code having data encoded in at least first and second data values as a plurality of bars, said method comprising the steps of:

obtaining a plurality of samples of the bar code during scanning thereof;

reducing sampling of said bar code between possible bar edge locations; and increasing sampling of said bar code adjacent possible bar edge locations, to thereby provide sampling on demand.

78. The method of claim 77 wherein said reducing step comprises the step of eliminating sampling of said bar code between possible bar edge locations.

* * * * *